United States Patent
Toriyama et al.

(10) Patent No.: US 6,608,703 B1
(45) Date of Patent: Aug. 19, 2003

(54) DATA RECEIVING DEVICE, DATA TRANSMITTING APPARATUS, DATA TRANSMITTING METHOD, AND IMAGE FORMING APPARATUS

(75) Inventors: Hideyuki Toriyama, Toyokawa (JP); Kenichi Takahashi, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/408,994

(22) Filed: Sep. 29, 1999

(30) Foreign Application Priority Data

Oct. 2, 1998 (JP) .......................... 10-281709
Oct. 12, 1998 (JP) .......................... 10-289140

(51) Int. Cl.$^7$ ................................ H04N 1/36
(52) U.S. Cl. ...................... 358/410; 358/409; 358/468; 375/316
(58) Field of Search ................ 358/409, 410, 358/412, 413, 468, 1.1, 1.7; 375/316, 355, 362, 371, 376; 345/213

(56) References Cited

U.S. PATENT DOCUMENTS 4,423,520 A * 12/1983 Murayama et al. ......... 375/376
4,977,414 A * 12/1990 Shimada et al. ............ 347/247
6,392,641 B1 * 5/2002 Nishimura et al. ......... 345/213

FOREIGN PATENT DOCUMENTS

JP 832629 2/1996
JP 8258329 10/1996

* cited by examiner

*Primary Examiner*—Mark Wallerson
(74) *Attorney, Agent, or Firm*—Sidley Austin Brown & Wood LLP

(57) ABSTRACT

When serial data 110, which includes synchronous data 110A and effective data 110B, is received, a hold signal 130 is set at "1" and the PLL control is stopped while the effective data 110B is being received. As a result, low-cost, high-speed data transmission can be realized. Here, when one frame is composed of a start bit, the synchronous data 110A, and the effective data 110B, when the serial data 110 is composed of a plurality of frames, and when the bit length of data that has been transmitted either between the rising edges or between the falling edges of the synchronous data of the consecutive frames is an integral multiply of the dividing ratio of a divided clock signal, phase synchronization by the PLL with minimum transmission period of the synchronous data can be realized. As a result, the efficiency of image data transmission can be improved.

19 Claims, 12 Drawing Sheets

DATA RECEIVING DEVICE, DATA TRANSMITTING APPARATUS, DATA TRANSMITTING METHOD, AND IMAGE FORMING APPARATUS

TITLE OF THE INVENTION

This application is based on application Nos. 10-281709 and 10-289140 filed in Japan, the contents of which are hereby incorporated by reference.

BACKGROUND OF THE INVENTION (1) Field of the Invention

The present invention relates to a data receiving device that receives serial data, a data transmitting apparatus that transmits the serial data, a method of transmitting the serial data, and an image forming apparatus that forms images using the transmitted data.

(2) Description of Related Art

Conventionally, a clock synchronization method has been used for data transmission in an image forming apparatus, for instance, when an image is read using an image reader and data of the image is transmitted from an image reading unit that creates the image data to an image forming unit. According to the clock synchronization method, two transmission paths, a data line and a clock line, are used, through which image data and clock signals are transmitted, respectively. Image data that has been transmitted through the data line is received using clock signals that have been transmitted through the clock line from the sending end.

According to the conventional clock synchronization method, however, the two transmission paths (including a transmission buffer, a wiring unit, and a reception buffer) from the data sending end to the data receiving end have a difference in amount of delay (referred to a "skew" in this specification). Under the circumstance, when the transmission rate is equal to or greater than several tens of megabits per second, the skew is too large to be neglected and data transmission is not assured.

On the other hand, high-speed and multifunctional copying machines have recently increased the amount of information to be transmitted. As a result, electromagnetic waves are radiated from a harness that transmits data at a high speed. In order to prevent the radiation of electromagnetic waves, expensive devices such as optical fibers may be used on the transmission path. In this case, it is desirable to use as small number of optical fibers as possible for a lower cost.

SUMMARY OF THE INVENTION

It is accordingly an object of the present invention to provide a data receiving device, a data transmitting apparatus, and a data transmitting method that realize a high-speed data transmission at a lower cost.

Another object of the present invention is to provide an image forming apparatus that forms images using image data that has been transmitted by and according to the data receiving device, the data transmitting apparatus, and the data transmitting method.

The above-mentioned first object may be achieved by a data receiving device that may include: a receiving unit for receiving image data and synchronous data that have been alternately transmitted from a sending end; a receiving clock generator for generating a receiving clock signal for latching data to be received; a PLL circuit for synchronizing phases of the generated receiving clock signal and the synchronous data; and a controller for stopping the PLL circuit synchronizing the phases while the receiving unit is receiving the image data.

In the data receiving device, phase synchronization of the receiving clock, which has been generated at the receiving end, is performed while the synchronous data is being received, and the image data can be received using the receiving clock. As a result, it is not necessary to provide different transmission paths for the synchronous data and the image data, so that a lower-cost, high-speed data transmission can be realized.

The first object may be also achieved by a data transmitting apparatus that may include: a data sending device that includes a sending unit for sending a plurality of frames of serial data which each include synchronous data and effective data; and a data receiving device that includes (1) a receiving unit for receiving the serial data, (2) a receiving clock generator for generating a receiving clock signal, (3) a frequency divider for dividing frequency of the receiving clock signal and generating a divided clock signal, (4) a PLL circuit for synchronizing phases of the generated divided clock signal and the received synchronous data, and (5) a controller for stopping the PLL circuit synchronizing the phases while the effective data is being received.

The first object may be also achieved by a data transmitting method in a data transmitting apparatus that includes a data sending device that sends a plurality of frames of serial data which each include synchronous data and effective data, and a data receiving device that receives the serial data, the data transmitting method may include: a phase synchronizing step for synchronizing phases of the synchronous data that has been received by the data receiving device and a receiving clock signal that has been generated in the data receiving device; and a phase synchronization stopping step for stopping the phase synchronization before reception of the effective data.

The above-mentioned second object may be achieved by an image forming apparatus that may include: a data receiving device that includes, a receiving unit for receiving image data and synchronous data that have been alternately transmitted from a sending end, a receiving clock generator for generating a receiving clock signal for latching data to be received, a PLL circuit for synchronizing phases of the generated receiving clock signal and the synchronous data, and a controller for stopping the PLL circuit synchronizing the phases while the receiving unit is receiving the image data; and an image forming unit for forming images according to the received image data.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF PREFERRED EMBODIMENT

Explanations of preferred embodiments of the present invention will be given below by taking a case as an example in which data transmission according to the present invention is performed by a copying machine.

THE FIRST EMBODIMENT

(1) Overall Structure of Copying Machine

Figure 1:
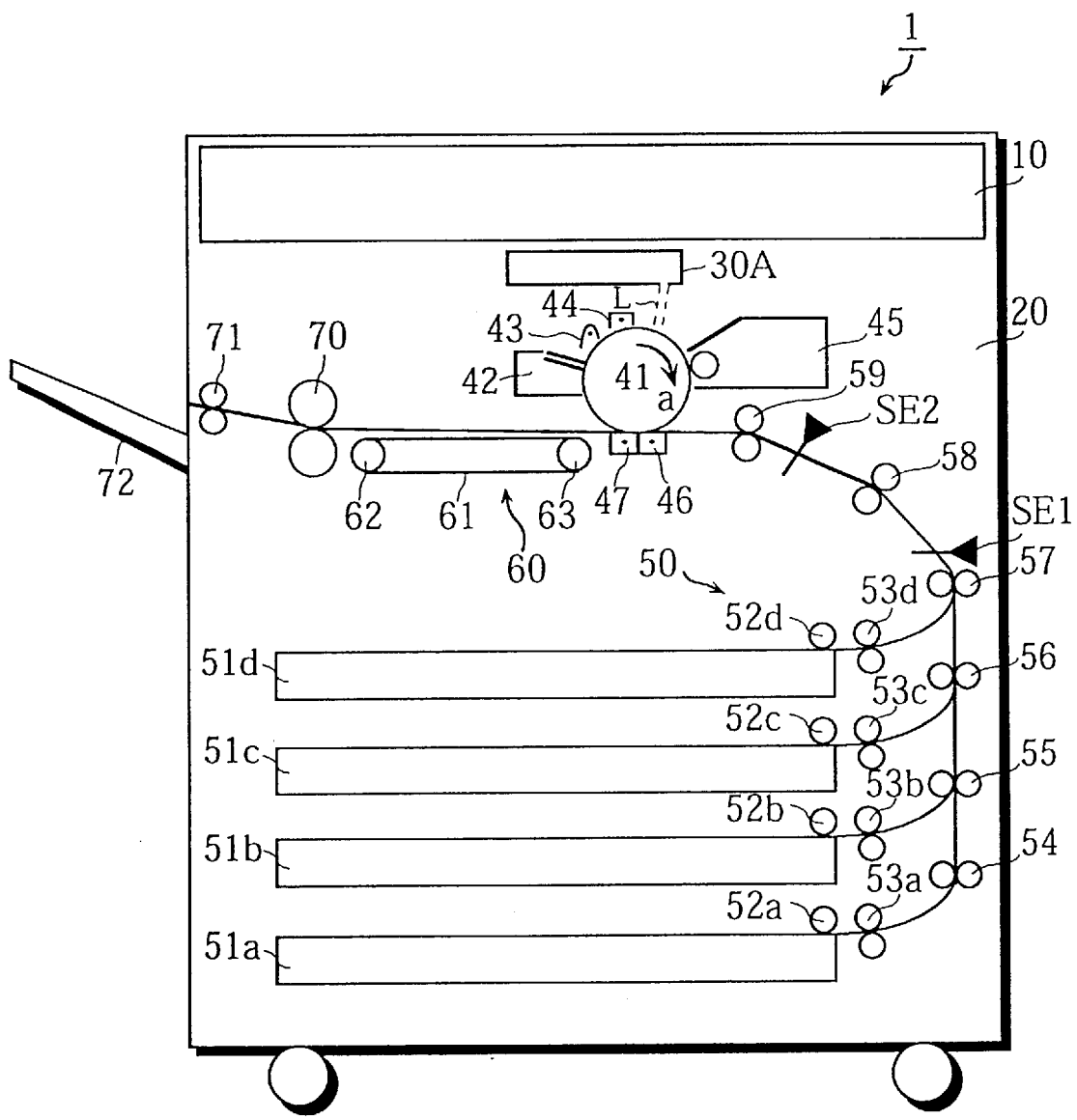
FIG. 1 shows the overall construction of a copying machine according to the present invention.

FIG. 1 is a simplified sectional view showing the overall construction of a copying machine according to the present invention.

As shown in FIG. 1, a copying machine 1 according to the present embodiment includes an image reading unit 10 and an image forming unit 20. The image reading unit 10 reads the image of a document using an image reader and the like-and generates image data. The image forming unit 20 forms an image on a copy sheet according to the generated image data.

In the image forming unit 20, a photoconductive drum 41 is provided so that the photoconductive drum 41 can rotate in the direction of an arrow "a". Around the photoconductive drum 41, a sensitizing charger 44, a developing unit 45, a transfer charger 46, a separating charger 47, a cleaner 42, and an eraser lamp 43 are positioned. The sensitizing charger 44, the developing unit 45, the transfer charger 46, and the separating charger 47 form images in an electrophotographic process. The cleaner 42 removes residual toner on the photoconductive drum 41, and the eraser lamp 43 removes residual electric charge.

The electrophotographic process is well known in the art, so that any detailed explanation will not be given here. More specifically, the surface of the photoconductive drum 41 that has been charged by the sensitizing charger 44 is exposed by a laser beam L projected from a laser beam optical scanning system 30A according to the image data that has been transmitted from the image reading unit 10 to form an electrostatic latent image on the surface of the photoconductive drum 41.

The formed electrostatic latent image is developed into a visible toner image by the developing unit 45, and the toner image is printed on a copy sheet by the transfer charger 46 that has been transported so that the copy sheet touches the surface of the photoconductive drum 41 on the bottom.

Note that a plurality of paper feed cassettes 51a to 51d are positioned on the lower part of the image forming unit 20. Each of the paper feed cassettes 51a to 51d holds a pile of copy sheets, and the copy sheets are controlled so that rollers feed and transport the copy sheets for printing process one by one.

More specifically, a copy sheet is selectively fed from the paper feed cassettes 51a to 51d by paper feed rollers 52a to 52d and transported by rollers 53a to 53d and 54 to 58 on a transportation path. When the sensors SE1 and SE2 check that the copy sheet passes, the process is continued. After stopped once by a timing roller 59, the copy sheet is sent to a transfer unit in synchronization with the toner image that has been formed on the surface of the photoconductive drum 41.

After that, when the toner image on the surface of the photoconductive drum 41 has been transferred onto the copy sheet, the separating charger 47 separates the copy sheet from the photoconductive drum 41. The copy sheet is transported to a fixing roller 70 by a paper transport belt 61. The fixing roller 70 applies heat to the toner to fix the toner image on the copy sheet, and the copy sheet is transported to a paper tray that is positioned outside of the copying machine 1 by a transport roller 71.

(2) Data Transmission Process in the Present Invention

An explanation of the data transmission process by a data receiving device according to the present invention will be given below by taking a case as an example in which the laser beam optical scanning system 30A is the data receiving device, which receives image data that has been transmitted from the image reading unit 10.

Note that the laser beam optical scanning system 30A receives serial data that has been transmitted from the image reading unit 10 using a PLL (Phase-Locked Loop) control, extracts gradation data indicating an image, and converts the extracted gradation data into parallel data. When the converted parallel data is sent to a digital-to-analogue converter (not illustrated), a semiconductor laser is driven to perform light modulation and the laser beam L is projected. The projected laser beam L is deflected by a polarizer to scan the surface of the photoconductive drum 41. As a result, an electrostatic latent image is formed on the surface of the photoconductive drum 41.

Figure 2:
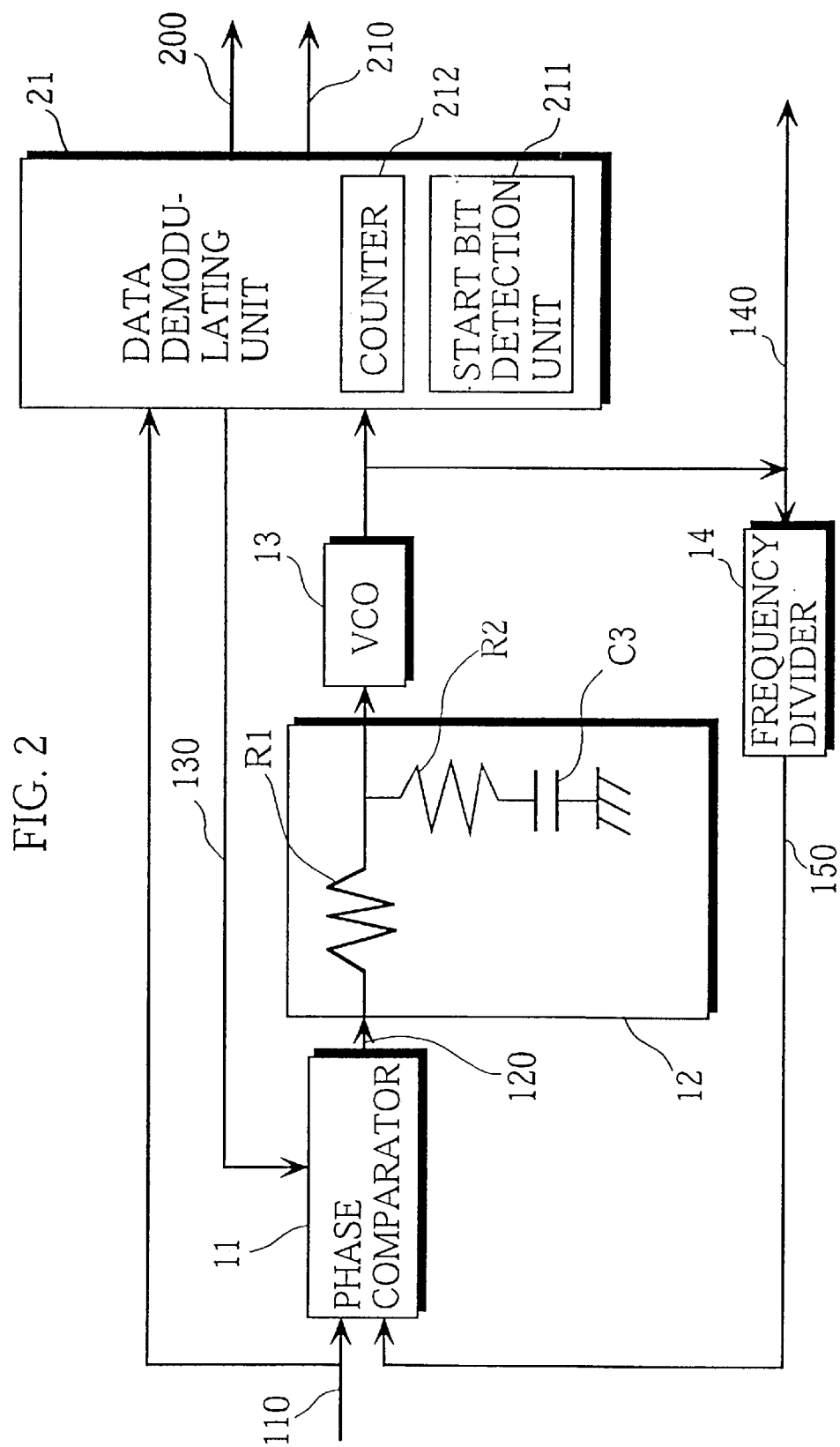
FIG. 2 is a block diagram showing the structure of a data receiving device according to the first embodiment of the present invention.

FIG. 2 is a block diagram showing the structure of the data receiving device according to the present embodiment. As shown in FIG. 2, the data receiving device of the present embodiment is composed of a part for the PLL control and a data demodulating unit 21. In the present embodiment, serial data 110 that has been transmitted from the data sending end such as the data sending device in the image reading unit 10 is input into the data demodulating unit 21 and a phase comparator 11 that is included in a PLL. An example of the structure of the serial data 110 will be given later.

The phase comparator 11 is composed of a charge pump circuit. The comparator 11 compares the phase of the serial data 110 with that of a divided clock signal 150, which has been obtained by dividing the frequency of a receiving clock signal 140 into halves that has been output from a voltage controlled oscillator (VCO) 13 with a frequency divider 14, and outputs a phase difference signal 120 according to the phase difference.

The phase difference signal 120 is input into a low pass filter (LPF) 12, which is composed of resistances R1 and R2 and a capacitor C3. The signal output from the LPF 12 controls the frequency of the signal that is to be output from the VCO 13. Since the VCO 13 changes an oscillation frequency by applying a voltage, the frequency of the receiving clock signal 140 is controlled in response to the output signal from the LPF 12. Note that the serial data 110 has a constant speed in the present embodiment, so that a VCO including a quartz resonator (about ±100 ppm), which has a high stability and has a small amount of change, can be used. The output signal from the VCO 13 is input into the data demodulating unit 21 as a receiving clock signal 140 for latching the serial data 110.

Here, an explanation of operations by the LPF 12 according to the phase difference signal 120 will be given. The phase comparator 11 outputs the phase difference signal 120 according to the phase difference between the two signals in accordance with the timing of the rising edges of the serial data 110 and the divided clock signal 150. More specifically, when the phase of the serial data 110 precedes that of the divided clock signal 150, the phase difference signal 120 provides the capacitor C3 in the LPF 12 with electric charge for a period of time corresponding to the phase difference. On the other hand, when the phase of the divided clock signal 150 precedes that of the serial data 110, the phase difference signal 120 removes an electric charge from the capacitor C3 in the LPF 12 for a period of time corresponding to the phase difference.

Figure 4:
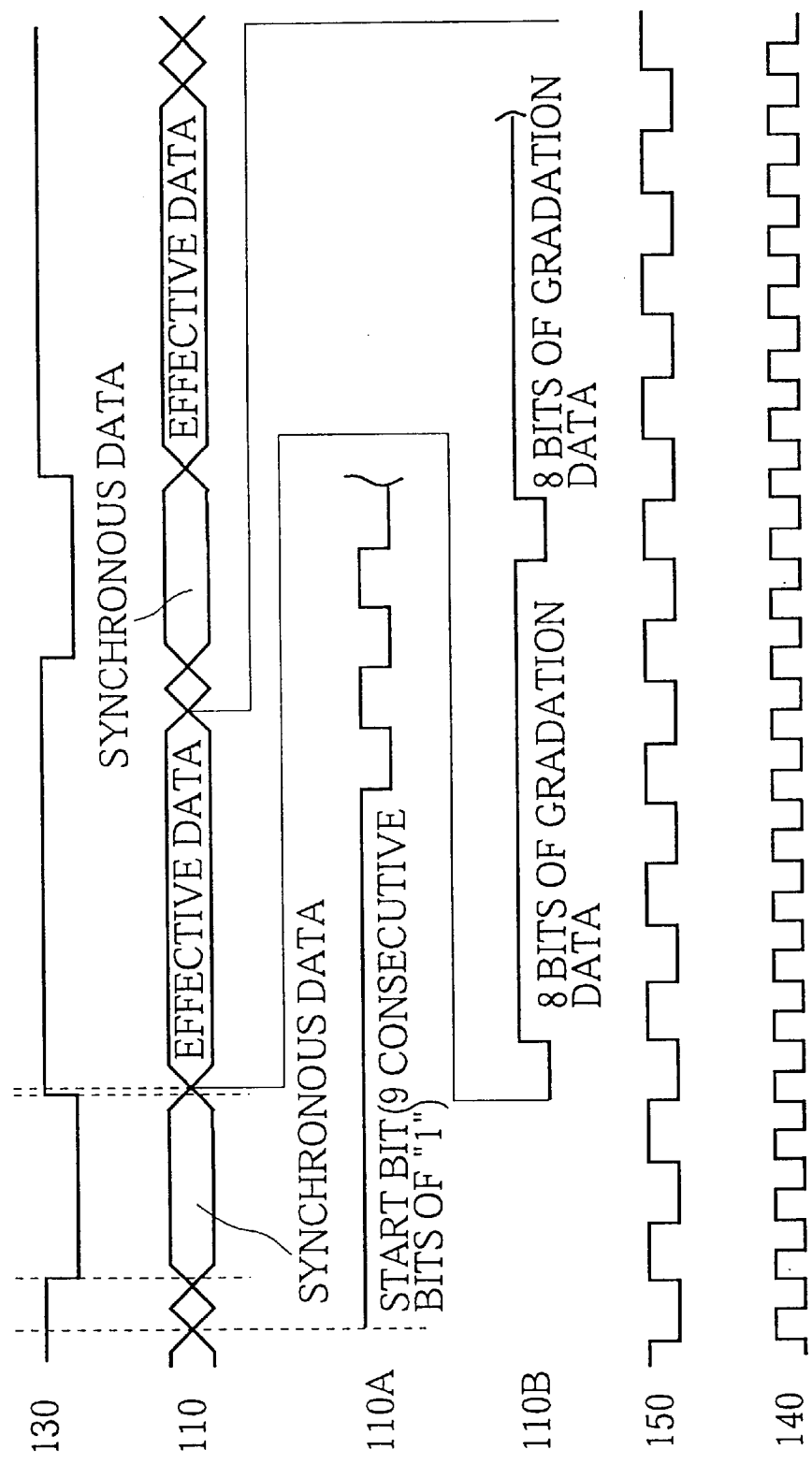
FIG. 4 shows an example of the structure of serial data when a half-frequency clock is used and how the PLL control is performed in the present embodiment.

As has been described, closed loop control is exerted so that the rising edges of the serial data 110 and the divided clock signal 150 coincide. As a result, as shown in FIG. 4, the rising edges of the serial data 110 and the divided clock signal 150 coincide and a stable state is realized. Note that a certain period of time is required for reaching the stable state, so that it is preferable to transmit synchronization data for the certain period of time after the turn-on of the power to realize the stable state, for example. This is because a start bit, which will be described later, can be recognized without a hitch even if a phase shift appears once a stable state is realized.

Note that the PLL control functions only while a hold signal 130 is "0". While the hold signal is "1", the electric charge of the capacitor C3 is hold, so that applied voltage onto the VCO 13 is fixed. As a result, the frequency of the receiving clock signal 140 is kept at a certain level and the PLL control stops.

The data demodulating unit 21 demodulates the serial data 110 using the receiving clock signal 140 and controls the phase comparator 11. The data demodulating unit 21 outputs eight bits of gradation data 200, which have been obtained by converting image data included in effective data 110 in the serial data into parallel data, and a control signal 210 to the digital-to-analogue converter (not illustrated).

Note that the data demodulating unit 21 includes a start bit detection unit 211 and a counter 212. The start bit detection unit 211 detects start bits included in the serial data 110. A start bit is a signal transmitted prior to the transmission of synchronous data 110A and is a standard for the counter 212 to count bits of data in order to recognize the synchronous data 110A and the effective data 110B. In the present embodiment, a nine consecutive bits of "1" signal is used as the start bit. The data demodulating unit 21 in the present embodiment recognizes that a predetermined number of bits after the detection of the start bit are synchronous data 110A and another predetermined number of bits after the synchronous data 110A are effective data 110B, for example. More specifically, the counter 212 counts the number of bits of the serial data 110 after the detection of a start bit.

Figure 3:
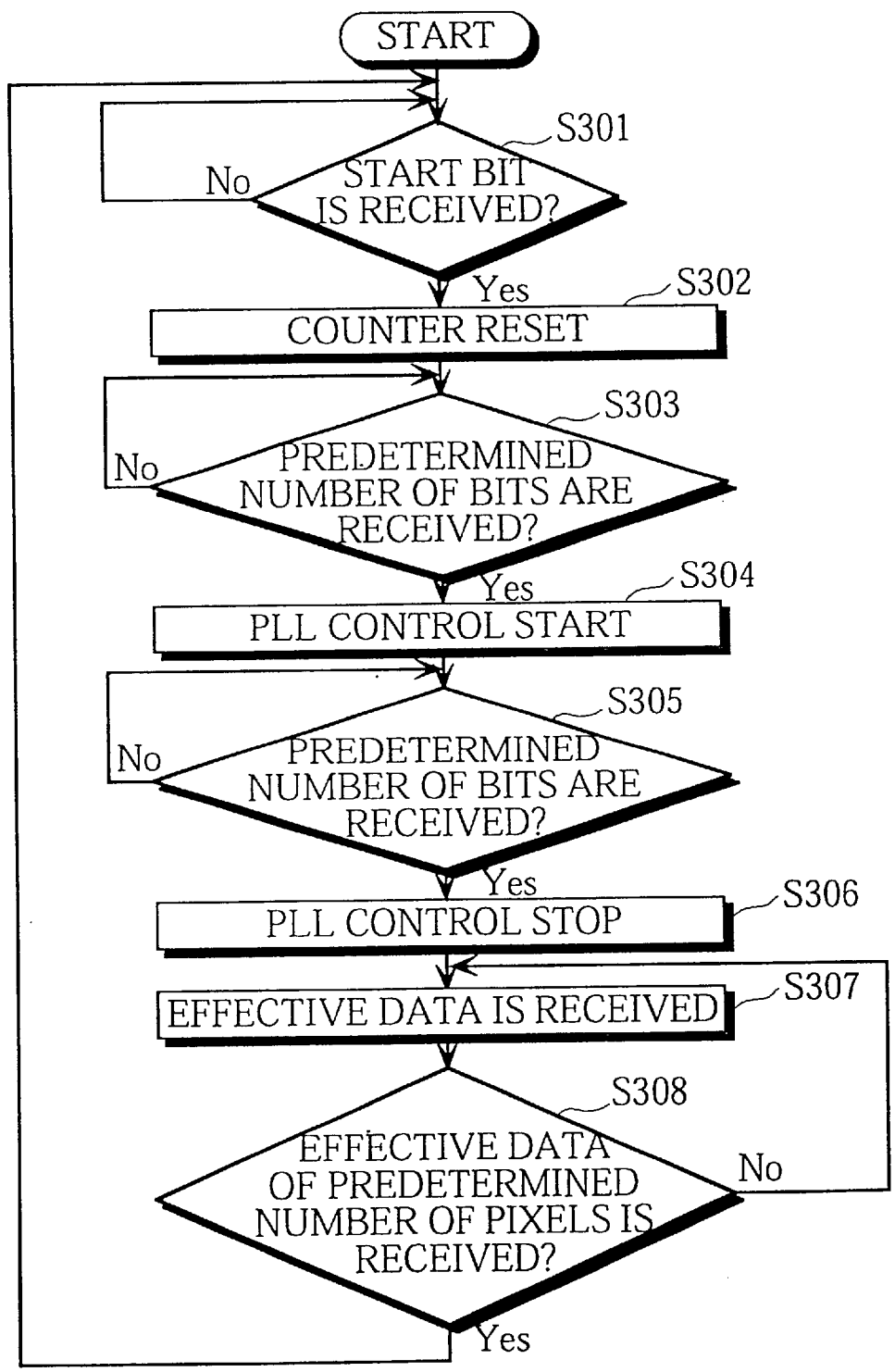
FIG. 3 is a flowchart illustrating operations by a data demodulating unit 21 in the first embodiment of the present invention.

FIG. 3 is a flowchart illustrating operations by the data modulating unit 21 in the present embodiment. As shown in FIG. 3, when receiving a start bit (when the result of the judgement at step s301 is "Yes"), the data demodulating unit 21 once resets the counter 212 (step s302) and starts counting the number of bits that have been received. When a predetermined number of bits of serial data 110 have been received, the data demodulating unit 21 recognizes that the synchronous data 110A is to be received (the result of the judgement at step s303 is "Yes") and starts the PLL control (step s304).

Then, when another predetermined number of bits of serial data 110 have been received (the result of the judgement at step s305 is "Yes"), the data demodulating unit 21 recognizes that phase synchronization by the PLL using the synchronous data is completed and stops the PLL control (step s306). As has been described, the PLL control starts and stops when the hold signal becomes "0" and "1".

After that effective data is received (step s307). Since the counter 212 continues to count number of bits during the reception of effective data, reception of effective data is continued until a predetermined number of pixels of image data, more specifically, data of pixels of one scanning line in the main scanning direction is received (the result of the judgement at step s308 is "No"). On the other hand, when the predetermined number of pixels of effective data have been received (the result of the judgement at step s308 is "Yes"), the data demodulating unit 21 enters a wait state. The data demodulating unit 21 is in the wait state until a start bit is detected again.

Here, an explanation will be given of an example of the structure of the serial data 110 in the present embodiment.

FIG. 4 shows an example of the structure of the serial data in the present embodiment and how the PLL control is performed. FIG. 4 shows an example in which a clock whose frequency has been divided into halves is used as the divided clock signal 150. As shown in FIG. 4, the serial data 110 includes start bits, synchronous data 110A, and effective data 110B. The 110A in FIG. 4 indicates an enlarged start bit and synchronous data, and the 110B indicates enlarged effective data. In data transmission of the present embodiment, data sequences are repeatedly transmitted in which one frame is comprised of data 110A and effective data 110B. While a start bit is inserted at the top of each frame in the example in FIG. 4, start bits between frames cannot be included when the first start bit is set as the standard and the contents of all the following received data is recognized according to the number of bits.

As has been described, when recognizing a start bit, the data demodulating unit 21 stops the PLL control by setting the hold signal 130 as "1" after receiving the predetermined number of bits. This is because normal PLL control cannot be performed since an edge does not always emerge during the reception of the effective data 110B according to the structure of the serial data 110 in the present embodiment.

Meanwhile, as shown in FIG. 4, the effective data 110B in the present embodiment includes eight bits (corresponding to one dot of pixel) of gradation data as gradation data for the light modulation by the semiconductive laser. It is ensured that one bit of "0" is added to the top of each eight bits of gradation data, in order to prevent a signal pattern of nine consecutive bits of "1" from arising.

Note that since the PLL control stops during the reception of the effective data 110B, the voltage applied to the VCO 13 gradually changes due to the leakage current at the output of the phase comparator 11 and the input of the VCO 13. As a result, edge shift starts to arise between the divided clock signal 150 and the serial data 110. The edge shift can be limited so that reception errors are avoided by setting the time constant of the LPF 12, the length of one frame, and the "Duty" or the ratio between the periods in which the PLL control is performed and not performed at appropriate values.

In the case of the laser beam optical scanning system 30A, it is appropriate that effective data in one frame includes eight bits of gradation data corresponding to the number of dots in one scanning line in the main scanning direction. In this case, the length of one frame is usually about 300 to 600$\mu$ seconds, and the edge shift can be limited within a range in which reception errors are avoided when the proportion of synchronous data in one frame is set at 5 to 10%.

Note that, as has been described, a signal pattern of nine consecutive bits of "1" can be recognized by phase synchronization at the turn-on even if a slight phase shift arises.

As has been described, data transmission using the data receiving device according to the present invention can reduce the number of communication devices for the transportation path compared with the conventional clock synchronization method. As a result, lower-cost, high-speed data transmission can be realized. Note that the structure of the serial data 110 of the present embodiment can lower the operating frequency at the time of transportation compared with a method of superimposing a clock signal on serial data, for example. As a result, lower cost can be realized using devices with a lower operating frequency, and the amount of transportation can be increased using devices of the same level of cost.

The explanation of the PLL control has been given in the explanation of the data receiving device using the receiving clock signal whose frequency is divided into halves. On the other hand, when the data is transmitted at a high-speed, it is necessary to perform the PLL control by further dividing the frequency of the receiving clock signal since it is difficult to realize a high-speed phase comparator for the PLL control under a certain circumstance. In this case, the PLL control may be performed using a divided clock signal that has been obtained by dividing the frequency of the receiving clock into quarters (or further) and by transmitting synchronous data having the same frequency as the divided clock.

Here, an explanation of a data transmitting apparatus will be given that enables the PLL to synchronize the phases of the synchronous data 110A and the divided clock signal 150 with the minimum transmission period of synchronous data to improve the transmission efficiency of image data when the dividing ratio of the divided clock signal is high.

Figure 5:
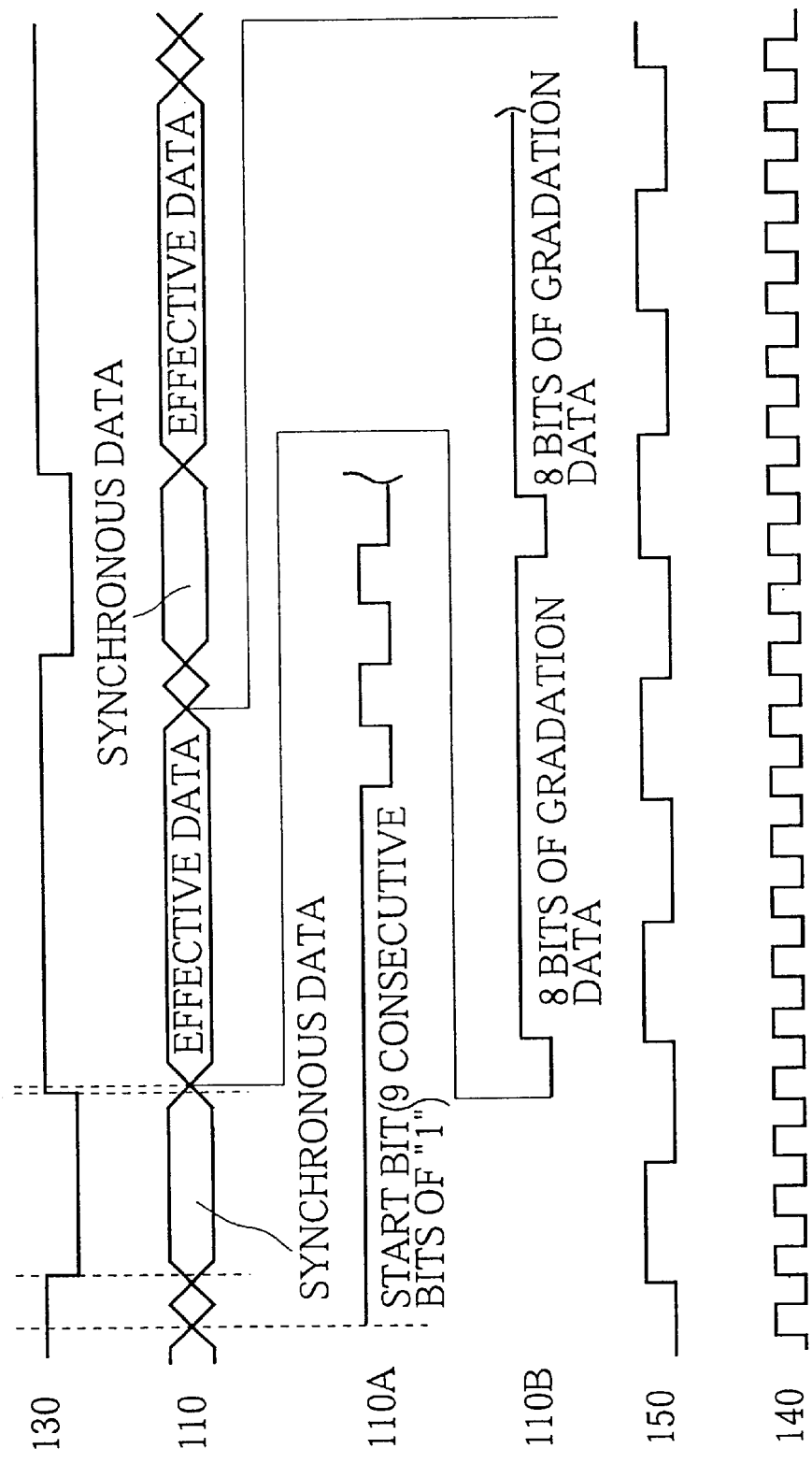
FIG. 5 an example of the structure of serial data and how the PLL control is performed when a quarter-frequency clock is used.
Figure 6:
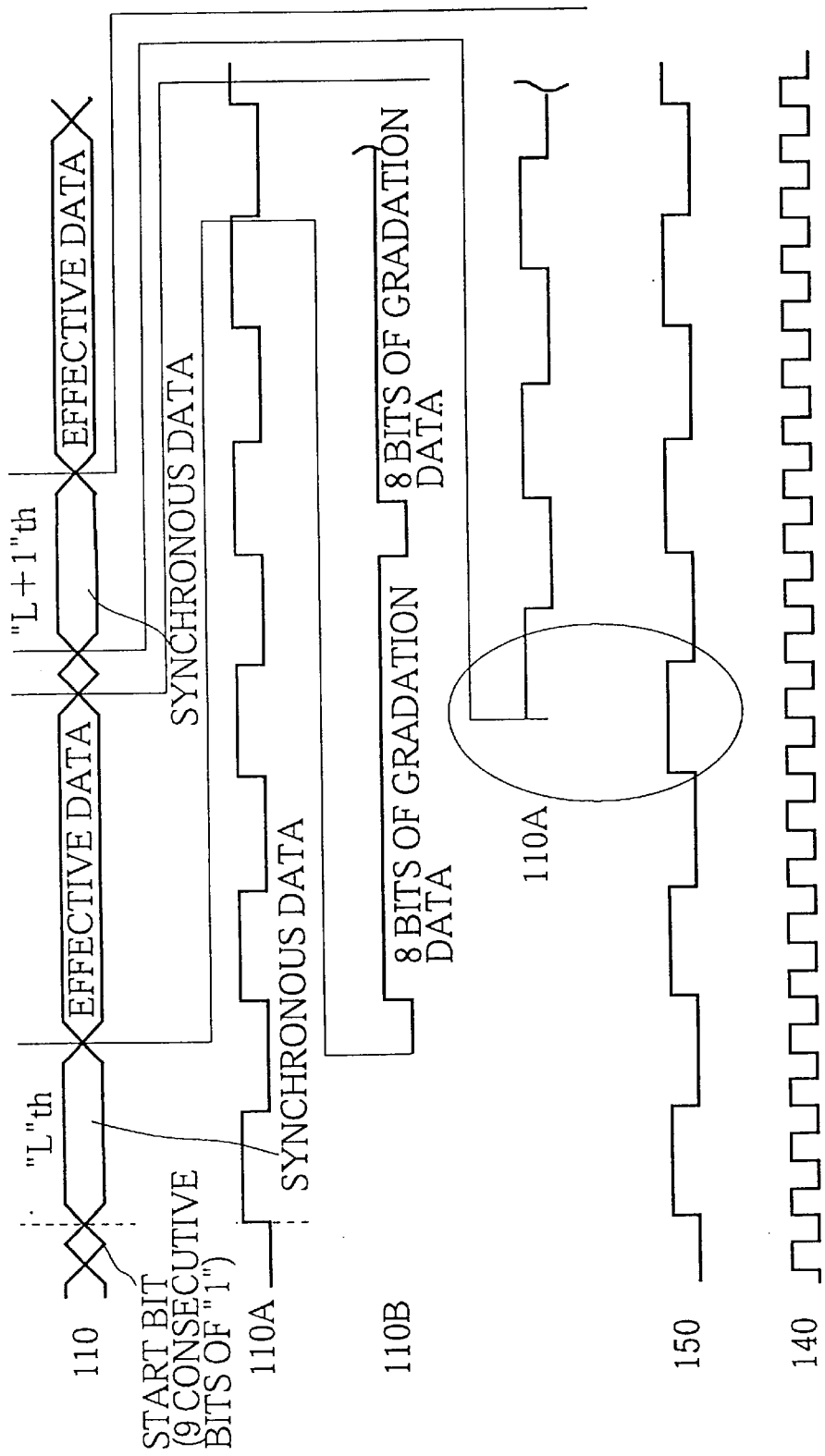
FIG. 6 shows an example of the structure of the serial data when a quarter-frequency clock is used and the frame length is not controlled.

FIG. 5 shows an example of the structure of the serial data 110 and how the PLL control is performed when a quarter-frequency clock is used. FIG. 5 is the same as FIG. 4 except for the divided clock signal 150 that is a quarter-frequency clock in FIG. 5, so that a detailed explanation will not given here. An explanation of the control of the bit length of one frame of the serial data 110 in the data transmitting apparatus according to the present embodiment will be given with reference to FIGS. 6 and 7. FIG. 6 shows an example when the frame length is not controlled and FIG. 7 shows an example when the frame length is controlled.

As shown in FIG. 6, when the frame length is not controlled, more precisely, when the bit length of the data transmitted between the first rising edges of the synchronous data of the "L"th frame and the synchronous data of the "L+1"th frame is not an integral multiple of 4, which is the dividing ratio, the edges of the divided clock signal 150 and the synchronous data 110A of the "L+1"th frame are out of phase by about $2\pi$ of the phase of the receiving clock at the start of the synchronous data 110A of the "L+1"th frame even if phase synchronization has been performed by the PLL control using the synchronous data 110A of the "L"th frame.

Figure 7:
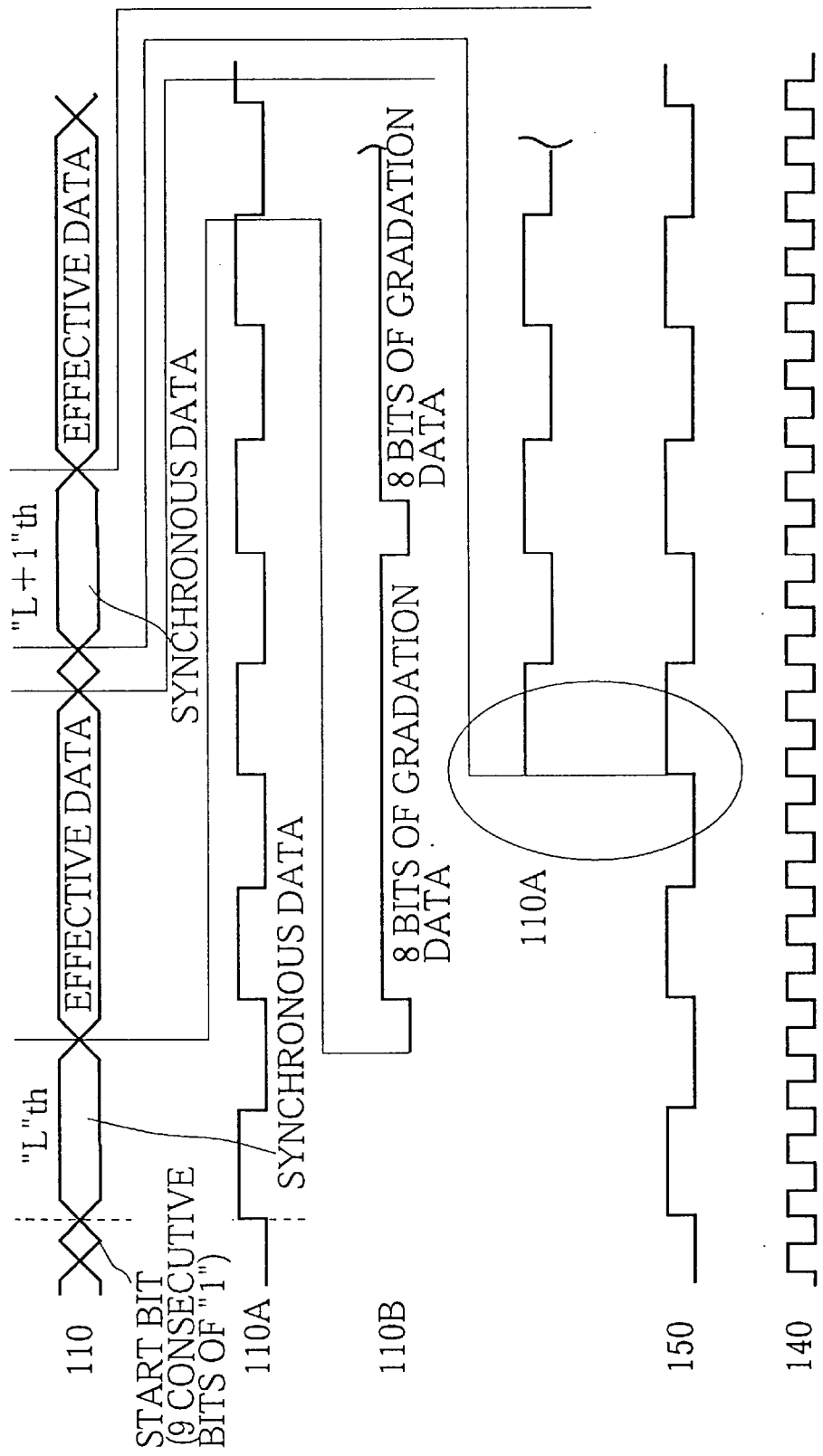
FIG. 7 shows an example of the structure of the serial data when the frame length is controlled in the data transmitting apparatus according to the present invention.

On the other hand, when the frame length is controlled as shown in FIG. 7, i.e., when the bit length between the rising edges of the two pieces of synchronous data is an integral multiple of 4, the edges of the divided clock signal 150 and the synchronous data 110A of the "L+1"th frame are not significantly out of phase at the start of the synchronous data 110A of the "L+1"th frame. As a result, phase synchronization is completed only by correcting the phase shift of the edges that arises as an error during the stop of the PLL control.

When a $2\pi$ of phase shift arises at the start of the phase synchronization as shown in FIG. 6, the PLL operates so that the $2\pi$ of phase shift is also corrected. As a result, phase synchronization takes a longer period of time, so that it is necessary to transmit the synchronous data 110A for a longer period of time, leading to a lower efficiency of data transmission.

With the data transmitting apparatus according to the present invention, however, the phase synchronization can be completed in a minimum transmission period. As a result, data can be transmitted more efficiently.

Here, a brief explanation of the structure of a data switching device will be given that is used in the data sending end when the frame length is controlled.

Figure 8:
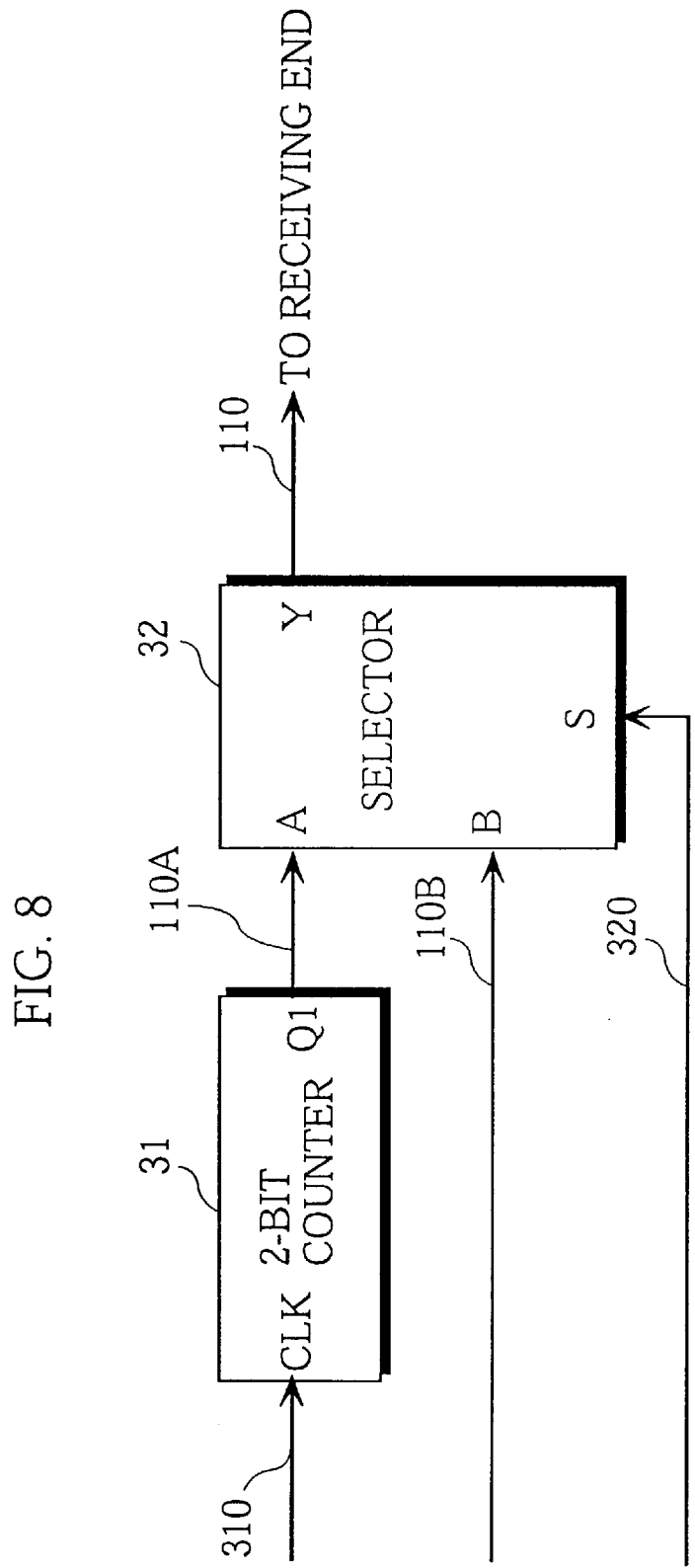
FIG. 8 is a block diagram showing the structure of a data switching device used in the data sending end in a data transmitting apparatus according to the present invention.

FIG. 8 is a block diagram showing the structure of the data switching device according to the present embodiment. As shown in FIG. 8, the data switching device according to the present embodiment includes a 2-bit counter 31 and a selector 32.

The 2-bit counter 31 divides a sending clock signal 310 into quarters to generate the synchronous data 110A. The selector 32 receives the instruction from the selection signal 320 to switch between the synchronous data 110A and the effective data 110B. Here, the start bit is supposed to be sent to the selector 32 from the same line as the effective data 110B. The selection signal 320 is controlled, for instance, by detecting that a start bit has been sent to the selector 32 and switching the selection signal 320. By doing so, the synchronous data 110A starts to be transmitted.

Here, it is possible to transmit the synchronous data 110A that satisfies the aforementioned relation between the bit length and the dividing ratio even if the selection signal 320 is switched at any time by performing no resetting, loading, and stopping.

The explanation of the first embodiment of the present invention has been given. Note that while a case in which the image data is eight bits of gradation data has been explained, the bit length is not limited to eight bits. For instance, when the bit length of gradation data is increased, the image data can be dealt with using a signal pattern whose bit length is longer than that of the gradation data by one bit as the start bit.

In addition, the cases where the bit length is controlled and not controlled in the data transmitting apparatus according to the present invention have been described taking the bit length between the first rising edges of the synchronous data of the "L"th frame and that of the "L+1"th frame as an example in the present embodiment. The control of the bit length is not limited to the relationship between the first rising edges. It is possible to obtain the effect of the present invention by controlling the bit length between the rising edges or the falling edges including middle or the last edges.

THE SECOND EMBODIMENT

An explanation of the second embodiment of the present invention will be given below.

In the first embodiment, the PLL control stops after the start bit has been detected and a predetermined number of bits of serial data has been received. On the other hand, an explanation of a processing method will be given in the present embodiment in which a horizontal synchronous signal, i.e., an SOS (Start of Scan) signal in the field of image processing apparatus is used. While the explanation of the present embodiment will be given with reference to figures, the same elements as in the first embodiment will be given the same reference numbers and detailed explanation of the elements will not be given.

Here, the SOS signal is a signal that is output when a laser beam is launched into a sensor that is provided in order to fix the scanning start position of the laser beam. From the detection of an SOS signal to that of another SOS signal, scanning of one scanning line has been performed.

Figure 9:
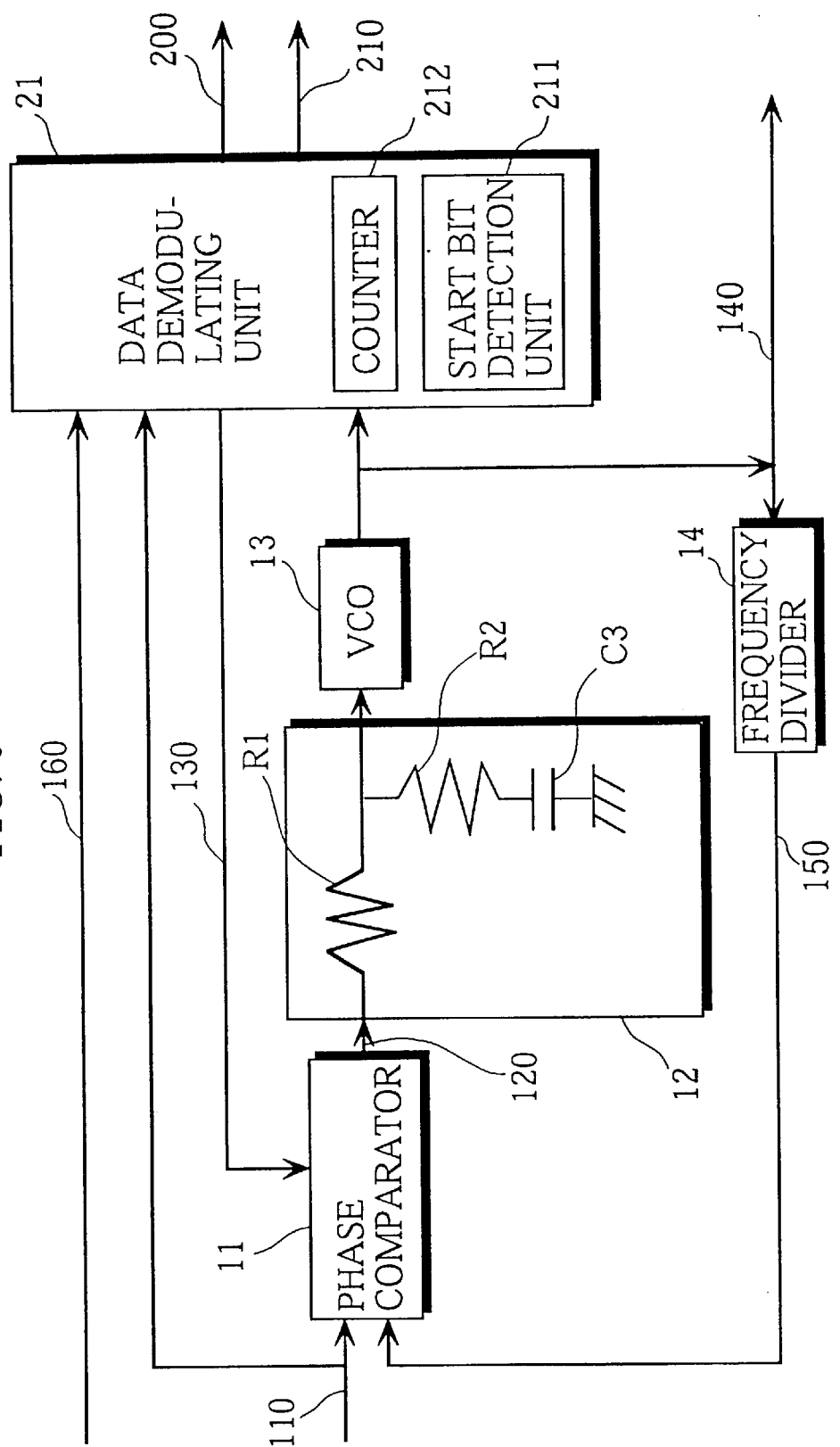
FIG. 9 is a block diagram showing the structure of a data receiving device according to the second embodiment of the present invention.

FIG. 9 is a block diagram showing the structure of a data receiving device according to the present embodiment. As shown in FIG. 9, the structure of the data receiving device according to the present embodiment is the same as that in the first embodiment except that a horizontal synchronous signal 160 is input into the data demodulating unit 21.

Figure 10:
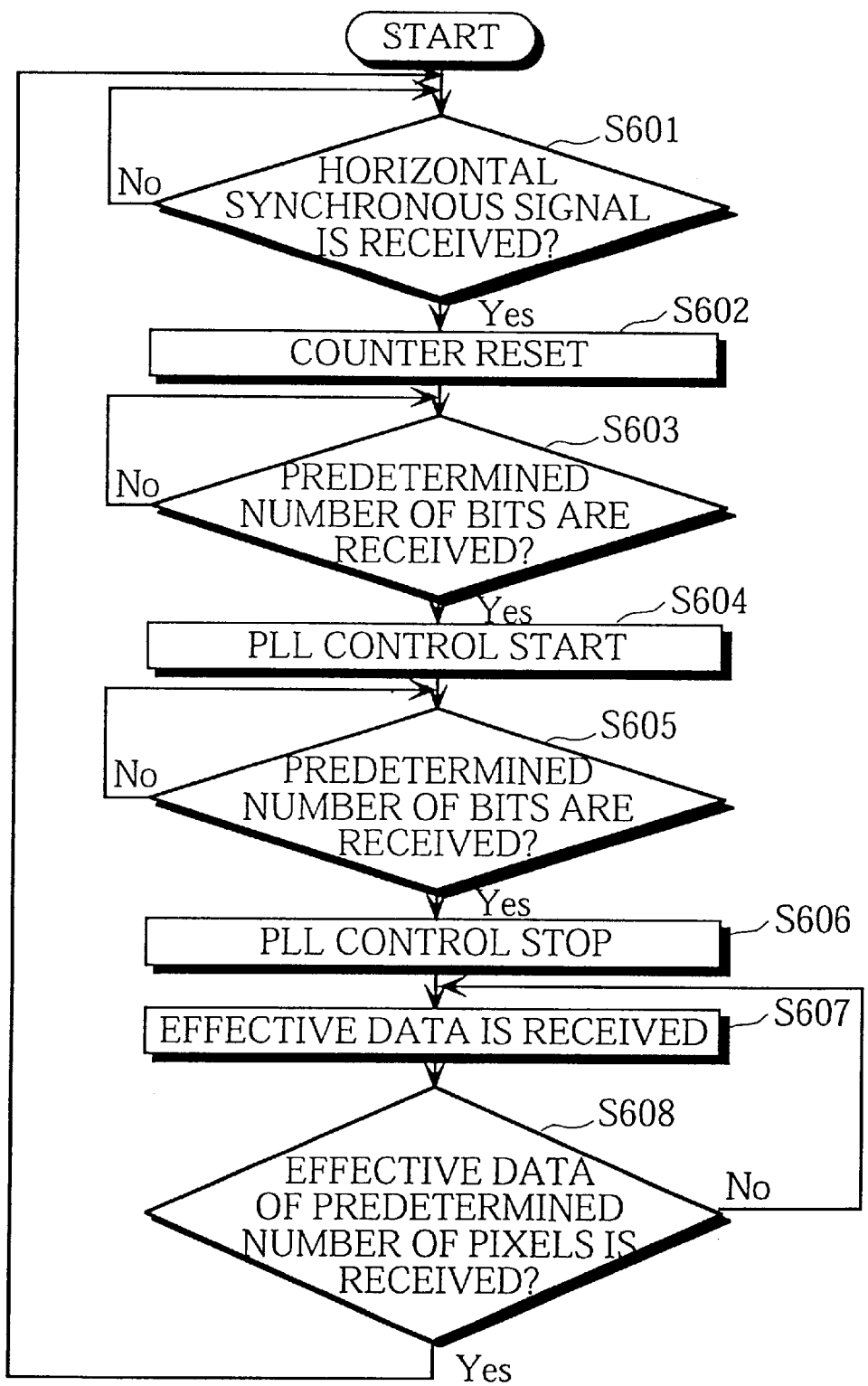
FIG. 10 is a flowchart illustrating operations by a data demodulating unit 21 in the second embodiment of the present invention.

FIG. 10 is a flowchart illustrating operations by the data demodulating unit 21 in the present embodiment. As shown in FIG. 10, the operations by the data demodulating unit 21 are basically the same as those in the first embodiment except that the horizontal synchronous signal 160 is detected instead of start bit at step s601 (steps s602 to s608).

Figure 11:
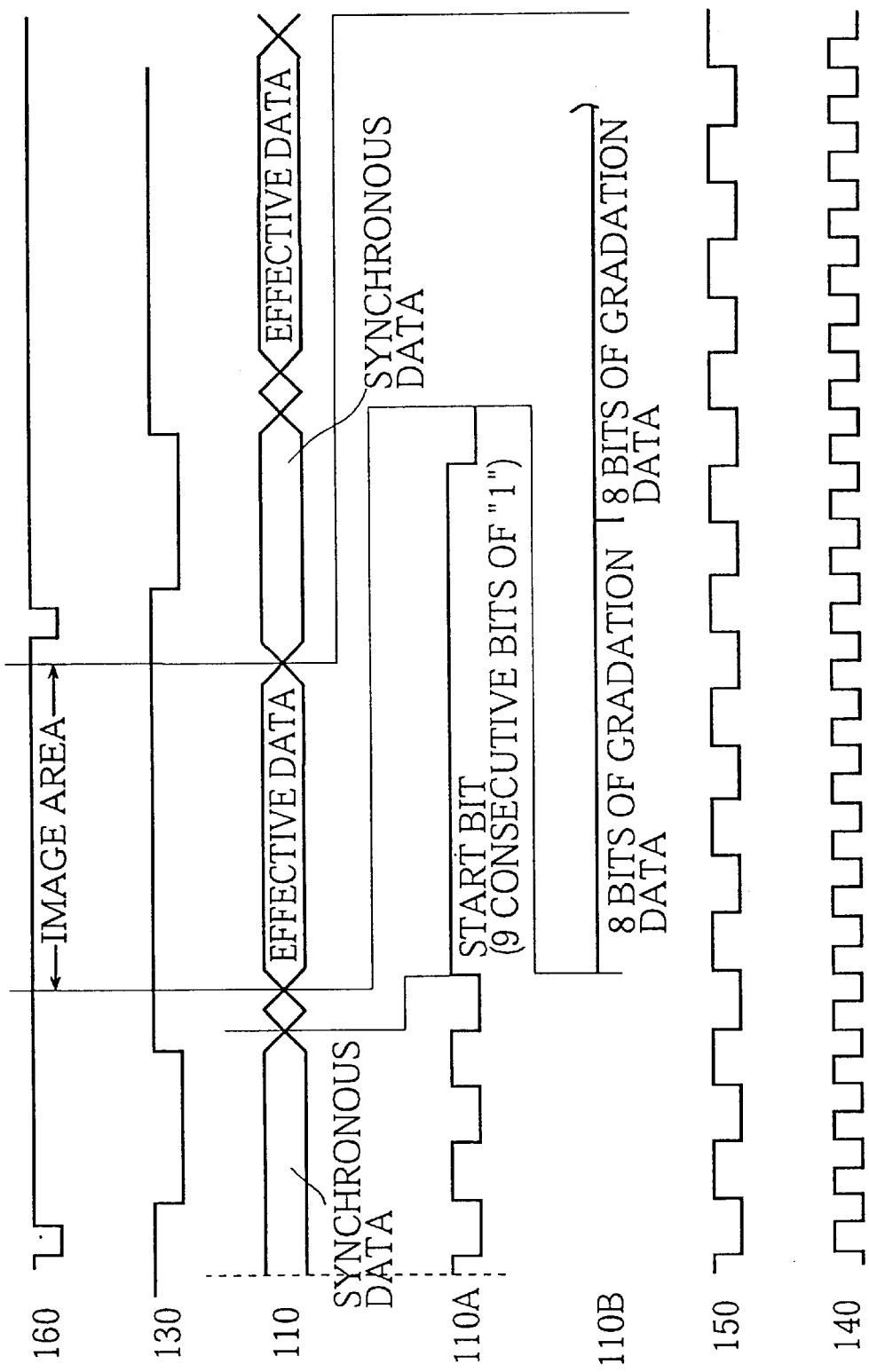
FIG. 11 shows an example of the structure of serial data and how the PLL control is performed in the second embodiment of the present invention.

FIG. 11 shows an example of the structure of the serial data 110 and how the PLL control is performed in the present embodiment.

As in the case of the first embodiment, the serial data 110 includes synchronous data, a start bit, and effective data. Note that the PLL control starts and stops with reference to the receiving timing of the horizontal synchronous signal 160 in the present embodiment as has been described, so that the start bit is not necessarily transmitted. However, the reason why it is preferable to transmit the start bit will be given later in the present embodiment. As in the case of the first embodiment, one frame is composed of synchronous data 110A and effective data 110B in this embodiment.

When the start bit is inserted as in the present invention, the data demodulating unit 21 enters a start bit wait state by detecting the horizontal synchronous signal 160. More specifically, when the reception of the horizontal synchronous signal 160 is detected in the flowchart in FIG. 11 (the result of the judgement at step s601 is "Yes"), and when a signal pattern of nine consecutive bits of "1" is detected, the signal pattern is recognized as the start bit.

As has been described, it is not necessary to add one bit of "0" to the top of eight bits of gradation data to recognize a start bit for the effective data 110B in the present embodiment. This is because once a start bit is recognized, detection of a signal of nine consecutive bits of "1" is ignored even if it is detected until the next detection of the reception of the horizontal synchronous signal 160.

The PLL control is stopped at the time of reception of the effective data 110B since normal PLL control cannot be performed during the reception of the effective data 110B as in the case of the first embodiment. On the other hand, the PLL control starts after the reception of the horizontal synchronous signal 160 since the phase synchronization of the serial data 110 is usually performed using the horizontal synchronous signal 160, more specifically, since the PLL control before the reception of the horizontal synchronous signal 160 is substantially meaningless due to the phase change of the serial data 110 before and after the reception of the horizontal synchronous signal 160. Even so, if the phase of the serial data 110 does not change before and after the reception of the horizontal synchronous signal 160, the PLL control can be performed before the reception of the horizontal synchronous signal 160.

In addition, the period of time required to transmit image data for forming an image on an image holding element such as the photoconductive drum 41 is recognized as an image area, and the effective data is transmitted only during the period corresponding to the image area in the present embodiment. Then, when eight bits of gradation data of one scanning line in the scanning direction has been transmitted as the effective data, the synchronous signal 110A starts to be transmitted again.

Here, a brief explanation of the structure of the data sending device used in the data sending end in the present embodiment will be given.

Figure 12:
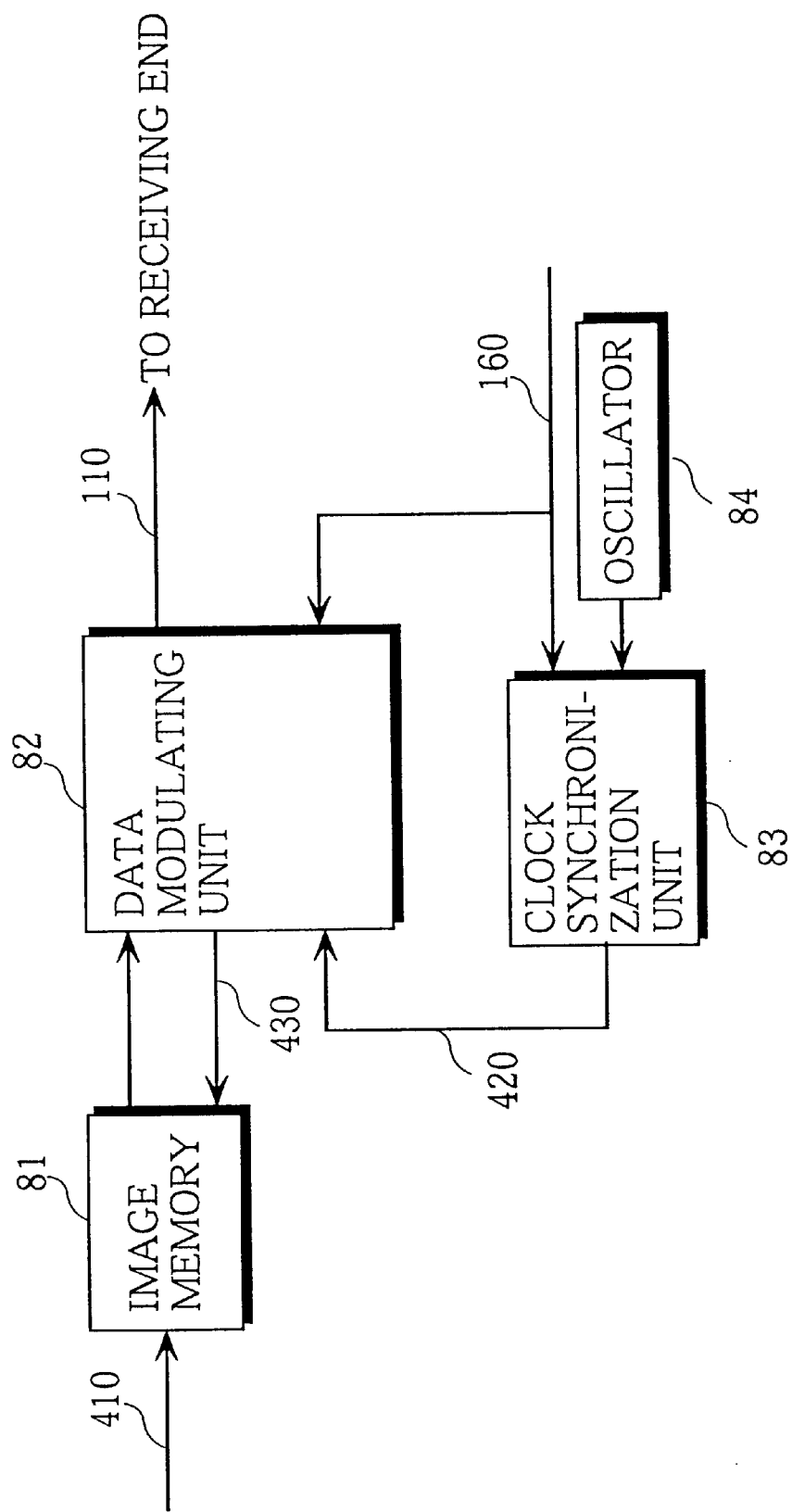
FIG. 12 is a block diagram showing the structure of a data sending device according to the second embodiment of the present invention.

FIG. 12 is a block diagram showing the structure of the data sending device according to the present embodiment. As shown in FIG. 12, the data sending device according to the present embodiment includes an image memory 81, a data modulating unit 82, a clock synchronization unit 83, and an oscillator 84.

Image data 410 that has been read and processed by, for instance, an image reader is temporarily stored in the image memory 81. The clock synchronization unit 83 synchronizes the phases of the horizontal synchronous signal 160 and a clock signal output from the oscillator 84, and outputs a transmitting clock signal 420 that is in phase with the horizontal synchronous signal 160. More specifically, the transmitting clock signal 420 is output that has a rising edge in phase with that of the horizontal synchronization signal 160 and has the same frequency as the clock signal output from the oscillator 84, so that the phase of the transmitting clock signal 420 is corrected for each main scanning line.

The data modulating unit 82 performs a process in synchronization with the transmitting clock signal 420 with reference to the horizontal synchronous signal 160 and outputs the serial data 110.

While the explanation of the structure of the serial data 110 has been given with reference to FIG. 11, the output timing of the synchronous data 110A, the start bit, and effective data 110B are determined according to the horizontal synchronous signal 160 in the sending end. More specifically, it is controlled that the first bit of effective data 110B is always output after a lapse of certain period of time from a rising edge of the horizontal synchronous signal 160.

Here, when reading image data from the image memory 81 using an image memory control signal 430, the data modulating unit 82 converts the read image data into serial data and transmits the serial data to the receiving end (for instance, the laser beam optical scanning system 30A) as effective data 110B. The process in the receiving end is the same as has been described earlier.

Note that as in the case of the first embodiment, the edge of the receiving clock signal 140 is gradually shifted from that of the serial data 110 with the stop of the PLL control for the data receiving device in the present embodiment. In the case of the present embodiment, it is also possible to reduce the degree of the shift of the edges by setting the time constant of the LPF 12, the length of one frame, and the "Duty" of "0" of the hold signal 130 at appropriate values.

While it is possible not to use any start bit in the present embodiment as has been described, an image forming position can be determined more precisely with the insertion of a start bit if the phase of the serial data 110 changes before and after the reception of the horizontal synchronous signal 160.

In addition, it is possible to provide the image memory 81 and the clock synchronization unit 83 for the horizontal synchronous signal and the image clock in the data receiving device. By doing so, image data can be transmitted even in an area aside from the image area, and the PLL control can be performed even if the synchronous signal 160 has not been received since the synchronous circuit is provided in the receiving end.

(Modifications)

While the explanation of the present invention has been given with reference to embodiments, the contents of the present invention is not limited to the specific examples that have been described in the embodiments. For instance, the invention can be realized by the modifications given below.

(1) While an example of data transmission from the image reading unit 10 to the laser beam optical scanning system 30A has been described in the embodiments, the scope of application of the present invention is not limited to the example. The present invention can be applied to data transmission in a variety of cases. Recently, an image forming device has been used in a network environment such as a LAN, so that this invention can be applied to data transmission from a personal computer and the like.

(2) While an example in which a copying machine is used as an image forming device has been described in the embodiments, the present invention can be applied to a variety of image forming devices such as a laser printer and a facsimile.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data receiving device, comprising:
   a receiving unit for receiving image data and synchronous data that have been alternately transmitted from a sending end;
   a receiving clock generator for generating a receiving clock signal for latching data to be received;
   a PLL circuit for synchronizing phases of the generated receiving clock signal and the synchronous data; and
   a controller for stopping the PLL circuit synchronizing the phases while the receiving unit is receiving the image data.

2. The data receiving device according to claim 1, wherein the controller includes an identification unit for identifying received data as one of the synchronous data and the image data.

3. The data receiving device comprising:
   a receiving unit for receiving image data and synchronous data that have been alternately transmitted from a sending end;
   a receiving clock generator for generating a receiving clock signal for latching data to be received;
   a PLL, circuit for synchronizing phases of the generated receiving clock signal and the synchronous data; and
   a controller for stopping the PLL circuit synchronizing the phases while the receiving unit is receiving the image data;
   wherein the controller includes an identification unit for identifying received data as one of the synchronous data and the image data, and
   wherein the identification unit identifies the received data as one of the synchronous data and the image data according to a number of bits of data that have been received after detection of a reference signal.

4. The data receiving device according to claim 3, wherein the reference signal is a start bit that is included in the received data.

5. The data receiving device comprising:
   a receiving unit for receiving image data and synchronous data that have been alternately transmitted from a sending end;
   a receiving clock generator for generating a receiving clock signal for latching data to be received;
   a PLL circuit for synchronizing phases of the generated receiving clock signal and the synchronous data; and
   a controller for stopping the PLL circuit synchronizing the phases while the receiving unit is receiving the image data;
   wherein the receiving unit repeatedly receives a predetermined number of bits of synchronous data and image data that is one scanning line of pixel data as one frame.

6. An image forming apparatus, comprising:
   a data receiving device that includes,
      a receiving unit for receiving image data and synchronous data that have been alternately transmitted from a sending end,
      a receiving clock generator for generating a receiving clock signal for latching data to be received,
      a PLL circuit for synchronizing phases of the generated receiving clock signal and the synchronous data, and
      a controller for stopping the PLL circuit synchronizing the phases while the receiving unit is receiving the image data; and
   an image forming unit for forming images according to the received image data.

7. The image forming apparatus comprising:
   a data receiving device that includes,
      a receiving unit for receiving image data and synchronous data that have been alternately transmitted from a sending end,
      a receiving clock generator for generating a receiving clock signal for latching data to be received,
      a PLL circuit for synchronizing phases of the generated receiving clock signal and the synchronous data, and
      a controller for stopping the PLL circuit synchronizing the phases while the receiving unit is receiving the image data; and
   an image forming unit for forming images according to the received image data,
      wherein the image forming unit includes a scanning unit for line scanning an image holding element according to the received image data, and the controller controls the PLL circuit so that the PLL circuit synchronizes the phases from detection of a horizontal synchronous signal, which indicates start of scanning of one scanning line, until start of writing on the image holding element.

8. The image forming apparatus comprising:
a data receiving device that includes,
   a receiving unit for receiving image data and synchronous data that have been alternately transmitted from a sending end,
   a receiving clock generator for generating a receiving clock signal for latching data to be received,
   a PLL circuit for synchronizing phases of the generated receiving clock signal and the synchronous data, and
   a controller for stopping the PLL circuit synchronizing the phases while the receiving unit is receiving the image data; and
an image forming unit for forming images according to the received image data,
wherein the image forming unit includes a scanning unit for line scanning an image holding element according to the received image data, and
the controller identifies received data as one of the synchronous data and the image data according to the number of bits of data that have been received after detection of a horizontal synchronous signal, which indicates start of scanning of one scanning line.

9. The image forming apparatus according to claim 6, further comprising:
an image reader for reading images on documents and obtaining the image data; and
a data sending device for sending the obtained image data to the data receiving device.

10. A data transmitting apparatus, comprising:
a data sending device that includes a sending unit for sending a plurality of frames of serial data which each include synchronous data and effective data; and
a data receiving device that includes
   (1) a receiving unit for receiving the serial data,
   (2) a receiving clock generator for generating a receiving clock signal,
   (3) a frequency divider for dividing frequency of the receiving clock signal and generating a divided clock signal,
   (4) a PLL circuit for synchronizing phases of the generated divided clock signal and the received synchronous data, and
   (5) a controller for stopping the PLL circuit synchronizing the phases while the effective data is being received.

11. The data transmitting apparatus according to claim 10, wherein a bit length of data that has been sent either between rising edges or between falling edges of the synchronous data of consecutive frames is an integral multiple of a dividing ratio of the frequency divider.

12. The data transmitting apparatus comprising:
a data sending device that includes a sending unit for sending a plurality of frames of serial data which each include synchronous data and effective data; and
a data receiving device that includes:
   (1) a receiving unit for receiving the serial data,
   (2) a receiving clock generator for generating a receiving clock signal,
   (3) a frequency divider for dividing frequency of the receiving clock signal and generating a divided clock signal,
   (4) a PLL circuit for synchronizing phases of the generated divided clock signal and the received synchronous data, and
   (5) a controller for stopping the PLL circuit synchronizing the phases while the effective data is being received,
wherein the data sending device further includes:
   a sending clock generator for generating a sending clock signal;
   a synchronous data generator for dividing frequency of the sending clock signal and generating the synchronous data; and
   a selector for determining whether the synchronous data or the effective data is to be sent.

13. The data transmitting apparatus according to claim 10, wherein the effective data is image data.

14. An image forming apparatus, comprising:
a data transmitting apparatus that includes,
   a data sending device having a sending unit for sending a plurality of frames of serial data which each include synchronous data and image data, and
   a data receiving device having
   (1) a receiving unit for receiving the serial data,
   (2) a receiving clock generator for generating a receiving clock signal,
   (3) a frequency divider for dividing frequency of the receiving clock signal and generating a divided clock signal,
   (4) a PLL circuit for synchronizing phases of the generated divided clock signal and the received synchronous data, and
   (5) a controller for stopping the PLL circuit synchronizing the phases while the image data is being received; and an image forming unit for forming images according to the image data that the data receiving device has received.

15. The image forming apparatus according to claim 14, further comprising an image reader for reading images on documents and obtaining the image data, wherein the data sending device sends the image data that has been obtained by the image reader to the data receiving device.

16. The image forming apparatus according to claim 14, comprising:
a data transmitting apparatus that includes,
   a data sending device having a sending unit for sending a plurality of frames of serial data which each include synchronous data and image data, and
   a data receiving device having
   (1) a receiving unit for receiving the serial data,
   (2) a receiving clock generator for generating a receiving clock signal,
   (3) a frequency divider for dividing frequency of the receiving clock signal and generating a divided clock signal,
   (4) a PLL circuit for synchronizing phases of the generated divided clock signal and the received synchronous data,
   (5) a controller for stopping the PLL circuit synchronizing the phases while the image data is being received; and
an image forming unit for forming images according to the image data that the data receiving device has received,
wherein the image data to be sent in one frame includes one scanning line of pixel data.

17. A data transmitting method in a data transmitting apparatus that includes a data sending device that sends a plurality of frames of serial data which each include synchronous data and effective data, and a data receiving device that receives the serial data, comprising:

a phase synchronizing step for synchronizing phases of the synchronous data that has been received by the data receiving device and a receiving clock signal that has been generated in the data receiving device; and a phase synchronization stopping step for stopping the phase synchronization before reception of the effective data.

18. The data transmitting method according to claim 17, wherein the receiving clock signal is a divided clock signal, the divided clock signal has been generated by dividing a frequency of a clock signal that is same as a frequency of the synchronous data using a predetermined dividing ratio, and the data sending device sends the serial data so that a bit length of data that has been sent either between rising edges or between falling edges of the synchronous data of consecutive frames is an integral multiple of the predetermined dividing ratio.

19. The data transmitting method according to claim 17, wherein the data sending device sends the serial data by repeatedly switching between sending of the synchronous data and the effective data.

\* \* \* \* \*